United States Patent [19]
Carr et al.

[11] Patent Number: 5,167,808
[45] Date of Patent: Dec. 1, 1992

[54] DEIONIZED WATER PURIFICATION SYSTEM

[75] Inventors: Greg Carr, Portland, Oreg.; Kevin Schumacher, Caldwell, N.Y.

[73] Assignee: S&K Products International, Inc., Chestnut Ridge, N.Y.

[21] Appl. No.: 568,042

[22] Filed: Aug. 16, 1990

[51] Int. Cl.$^5$ .................... B01D 29/52; B01D 29/56
[52] U.S. Cl. ............... 210/195.2; 210/195.1; 210/321.72; 210/433.1
[58] Field of Search ............... 210/321.6, 321.69, 650, 210/651, 900, 905, 908, 652, 282, 416.3, 251, 181, 641, 259, 411, 797, 195.1, 195.2, 321.72, 433.1

[56] References Cited

U.S. PATENT DOCUMENTS

| | | | |
|---|---|---|---|
| 4,431,545 | 2/1984 | Pall et al. | 210/641 |
| 4,495,067 | 6/1985 | Klein et al. | 210/900 |
| 4,904,382 | 2/1990 | Thomsen | 210/236 |

FOREIGN PATENT DOCUMENTS

| | | | |
|---|---|---|---|
| 203318 | 12/1986 | European Pat. Off. | 210/321.6 |
| 7167785 | 10/1982 | Japan | 210/650 |
| 1068393 | 1/1984 | Japan | 210/650 |
| 1287492 | 12/1986 | Japan | 210/900 |
| 1075092 | 3/1989 | Japan | 210/900 |
| 1254288 | 10/1989 | Japan | 210/650 |

Primary Examiner—Robert A. Dawson
Assistant Examiner—Ana M. Fortuna
Attorney, Agent, or Firm—Hugh D. Jaeger

[57] ABSTRACT

A DI water purification system for the point-of-use purification of water in applications demanding the highest quality of water. The system includes the following components: 1. dual submicron filters of 0.2 micron rating in parallel, housed in chemically inert housings; 2. a stacked-membrane or spiral-wound Ultrafilter module of nominal rating of 5000 to 100,000 molecular weight; 3. purge flowmeters appropriate to the purge requirements of the Ultrafilter; 4. chemically inert piping, gasket and sealing materials used to join the various sections of the system; and, 5. chemically resistant supports and housings to mechanically fasten the various components together. The DI water purification system is suitable for use in industries such as semiconductor, medical, pharmaceutical, chemical or any other application or use requiring ultrafiltered DI water.

1 Claim, 2 Drawing Sheets

DEIONIZED WATER PURIFICATION SYSTEM

BACKGROUND OF THE INVENTION

1. Field of the Invention

The present invention pertains to a DI water system, and more particularly, to an ultrapure DI water system through ultrafiltration.

2. Description of the Prior Art

There has always been a need for ultrapure DI water. Prior art DI water systems still contain impurities including microorganisms and bacteria Prior art systems are designed for lower flowrates no greater than 1.5 liters per minute. They are not designed to have the filters replaced with the unit in service, but must be shut down to charge out prefilters.

Prior art systems also do not contain a continuous flush to drain out the concentrated or rejected water. Although they contain recirculation pumps to intermittantly circulate the water internally, a continuous flush to drain is found to be superior, producing better quality product water.

The present invention overcomes the problems of the prior art DI water systems by providing ultrapure DI water at a higher flowrate than that possible with prior art systems.

SUMMARY OF THE INVENTION

The general purpose of the present invention is a small modular assembly of filters and ultrafilters suitable for the point-of-use purification for obtaining ultrapure DI water The system is unique in that it incorporates state-of-the-art components in all parts of the assembly, including piping, housings, active elements, and supports The system can be a stand-alone purifier assembly for moderately pure water, or a final purification system for the production of extremely pure DI water for critical applications in the semiconductor, microelectronic, pharmaceutical, medical, aerospace or any other industries.

The present invention is unique and novel in providing a complete and integrated system in one packaged system. No additional components are needed to effectively remove contaminants continuously from the water stream. These contaminants are continuously removed via a blowdown stream so that the ultrafilters do not need to be replaced The arrangement of dual prefilters allows the replacement of each of the disposable filters without a complete shutdown of the water feed or the system.

Significant aspects and features of the present invention include:

1. modular assembly allows installation near the final use point, minimizing piping and deadlegs;
2. chemically inert materials of construction ensure no leaking of contaminants into the water stream;
3. continuous flow of purge water through system minimizes the buildup of contaminants on the ultrafilter and downstream piping;
4. dual prefilters allows for filter replacement on-line without interrupting water flow; and,
5. an ultrafilter effectively removes all bacteria, particulate matter, colloidal matter, and reduces the levels of TOC, if due to oxidizer attack of Ion-Exchanger media.

Having thus described the preferred embodiments of the present invention, it is a principal object hereof to provide a DI water purification system with ultrafiltration.

One object of the present invention is a DI water system with ultrafiltration which can be used in any industry, such as medical, semiconductor, chemical, industries, etc.

Another object of the present invention is a DI water system which is easily maintainable.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
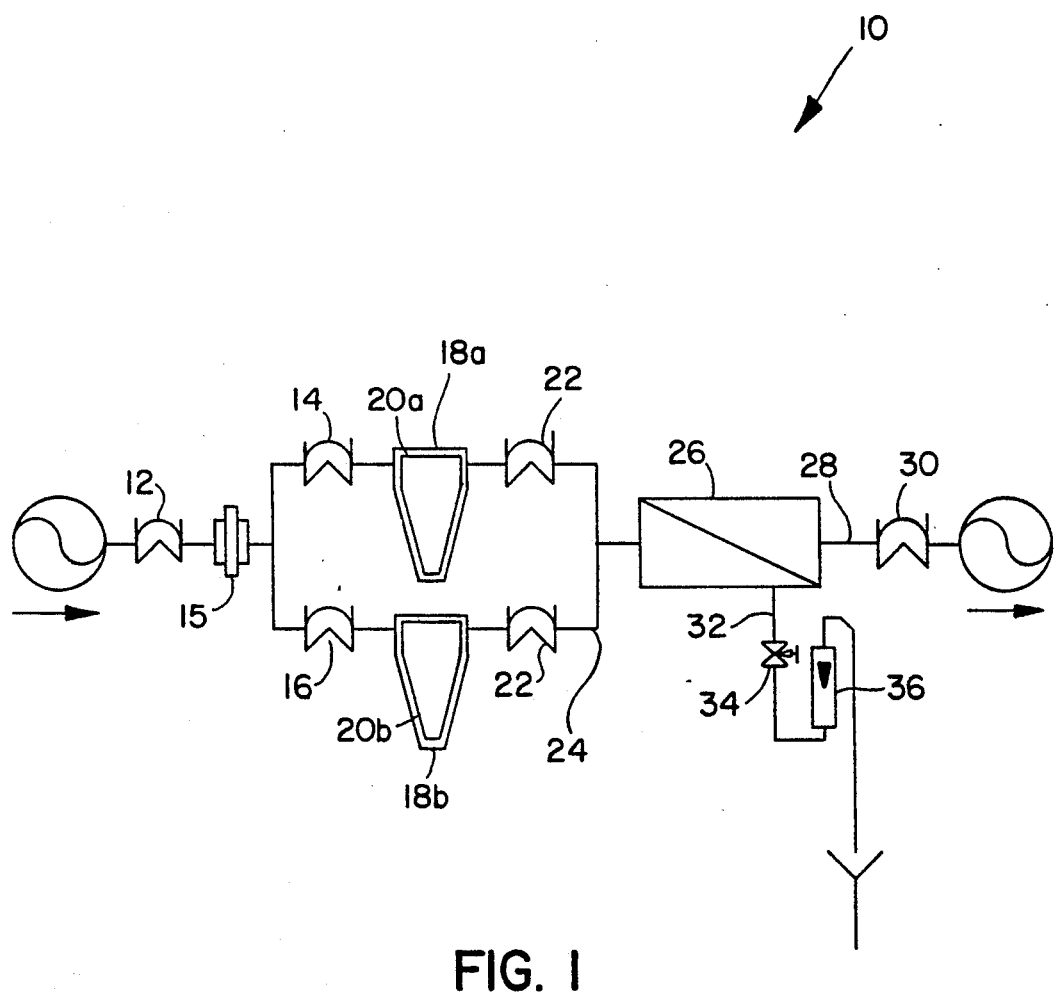
FIG. 1 illustrates a schematic diagram of a DI water purification system, the present invention.
Figure 2:
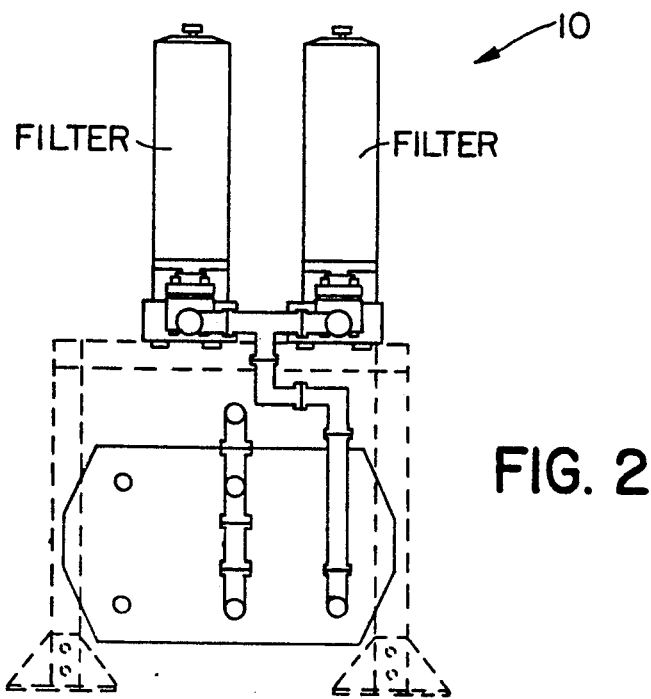
FIG. 2 illustrates a left side view of the DI water purification system.
Figure 3:
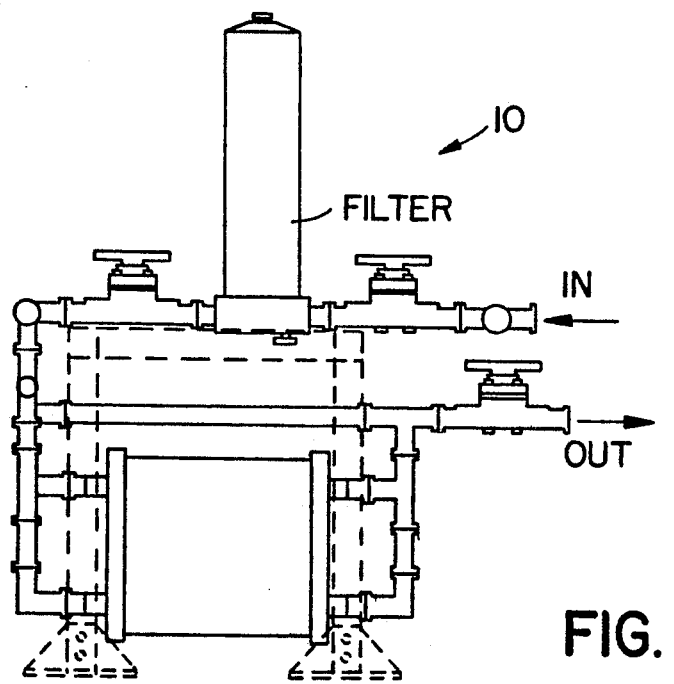
FIG. 3 illustrates a front view of the DI water purification system.

FIG. 1 illustrates a schematic diagram of deionized water (DI) purification system 10 for point-of-use purification of water immediately before utilization in an apparatus or group of apparatuses, such as semiconductor process tools The system incorporates a number of main components including, but not limited to, an inert piping system, submicron prefilters 20a and 20b in inert filter housings 18a and 18b, an ultrafilter (UF) 26, a purge rotameter 36, and isolation valves 12, 16, 22 and 30.

The deionized water (DI) 40 enters the system 10 through the initial isolation valve 12. The initial isolation valve is connected to the filter inlet manifold 15. The filter inlet manifold is made of an inert polymer PVDF, or other suitable material, to minimize contamination of the DI water passing through it. This filter manifold has two outlets, each connected to filter inlet isolation valves 14 and 16. These valves are all diaphragm-type valves where a flexible membrane is pressed against an immovable weir, fabricated as part of the valve body. The flexible diaphragm is manufactured of an inert fluorocarbon material to provide contamination of the DI water. The filter inlet isolation valves are then directly connected to the inert filter housings 18. The filter housings are made of the inert polymers PFA or PVDF, again to provide the minimum contamination to the DI water. At least one filter 20 is mounted inside each filter housing 18. The filters 20 are of a nominal size rating, between 1 and 0.1 micron sized holes. The filters serve to remove the majority of particulate matter and bacteria from the DI water as a preliminary purification step. The filter housings 18 are connected on the outlet directly to additional filter outlet isolation valves 22 of identical construction to the inlet valves. The filter outlet isolation valves directly connect to a filter outlet manifold 24 that connects both valves to the ultrafilter 26 inlet. The ultrafilter (UF) 26 is a stacked-membrane or spiral-wound UF, with a nominal size removal rating of 100,000 to 5000 MW (Molecular Weight), and it is sized sufficiently to provide adequate water flow at an acceptable pressure drop. The UF 26 serves to remove all the remaining bacteria and particulate contamination from the DI water. In addition, it partially removes dissolved colloids of organic and inorganic nature, as well as dissolved organic material of subcolloid size. The UF product discharge line 28 connects to the product isolation valve 30. The majority of the processed water exits this line, purified of all the incoming contamination. The UF concentrate line 32 connects to a small water flow control valve 34 and flowmeter or purge rotameter 36.

MODE OF OPERATION OF FLOW CONTROL

The flowmeter or purge rotameter 36 measures the flow of DI water purged out of the UF 26 as a concentrated waste stream. The flow of water is critical to flush away the concentrated materials. In addition, the constant water flow inhibits the growth of bacteria and other microorganisms inside the UF 26, piping manifolds, valves and filters that constitute the purification system. The flowmeter or purge rotameter outlet is directed to an available wastewater drain in the area, not part of the purification system. If desired, the concentrate waste can be recovered for reuse in a process that does not have such critical water quality requirements.

Various modifications can be made to the present invention without departing from the apparent scope hereof.

I claim:

1. A DI Water purification system for connection between a source of DI water and a point of use comprising:
   a. a source of DI water;
   b. at least one isolation valve connected to the source;
   c. two filter housings in parallel connected to said isolation valve(s) downstream from the isolation valve(s);
   d. a submicron filter in each of said filter housings;
   e. at least two isolation valves connected to said filter housings downstream from the HOUSINGS;
   f. an ultrafilter connected to said isolation valves downstream from the isolation valves;
   g. in series, a concentrate line, flow control valve, and flow meter connected to said ultrafilter; and,
   h. a point of use connected to said ultrafilter.

* * * * *